United States Patent [19]
Strobel et al.

[11] 3,784,290
[45] Jan. 8, 1974

[54] DEFOCUSING DEVICE FOR OPTICAL SYSTEMS

[75] Inventors: Joseph Strobel, Roxheim; Norbert Beisiegel, Traisen, both of Germany

[73] Assignee: Jos. Schneider & Co., Optische Werke, Bad Kreuznach, Germany

[22] Filed: May 24, 1972

[21] Appl. No.: 256,246

[30] Foreign Application Priority Data
May 26, 1971 Germany............... P 21 26 131.4

[52] U.S. Cl. ............................................. 352/91
[51] Int. Cl. ............................................. G03b 21/36
[58] Field of Search ............................. 352/91

[56] References Cited
UNITED STATES PATENTS

| | | | |
|---|---|---|---|
| 745,313 | 12/1903 | Bate | 95/64 |
| 1,530,238 | 3/1925 | Corlett | 95/64 |
| 3,603,676 | 9/1971 | Loewe | 352/91 |
| 2,148,508 | 2/1939 | Seitz | 352/91 |

*Primary Examiner*—John M. Horan
*Attorney*—Karl F. Ross et al.

[57] ABSTRACT

To produce a totally blurred image in the dissolution of a moving-picture scene, a camera objective of the varifocal type is provided with an iris diaphragm whose leaves consist of light-scattering translucent material.

5 Claims, 4 Drawing Figures

PATENTED JAN 8 1974
3,784,290
Fig. 1
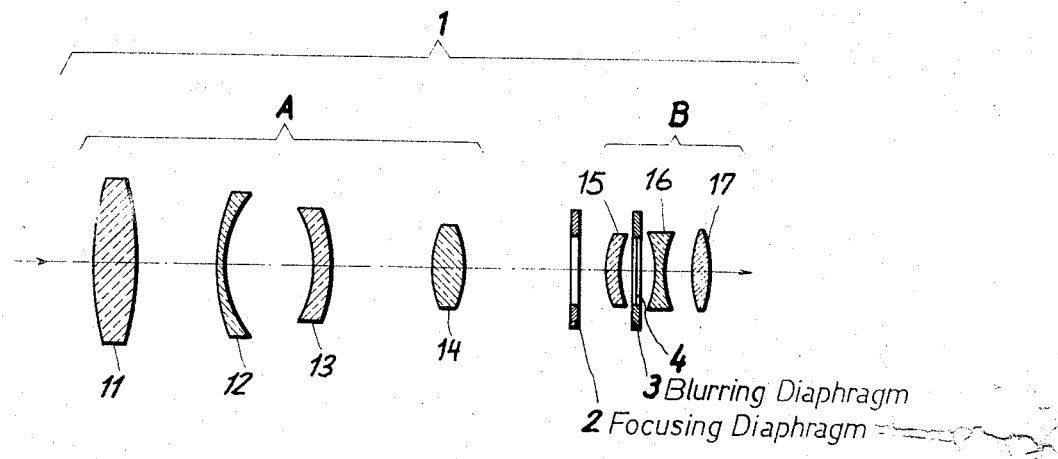
Fig. 2
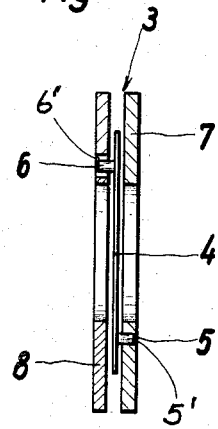
Fig. 3
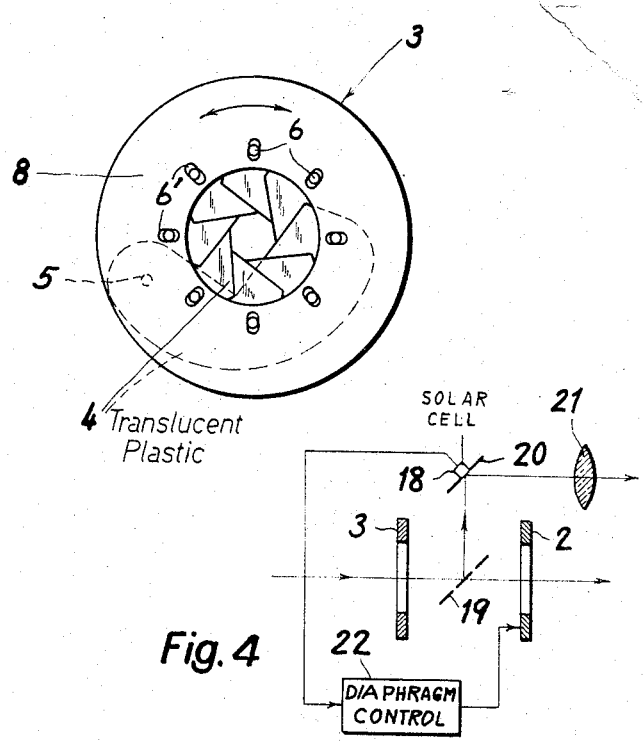
Fig. 4

DEFOCUSING DEVICE FOR OPTICAL SYSTEMS

Our present invention relates to the technique of defocusing a photographically projected image for the purpose of creating an effect of dissolution of a moving-picture scene, either in the filming of motion pictures or on television.

Such dissolution effects can be conventionally realized by the shifting of one or more objective lenses. With this procedure, however, one generally causes only a partial blurring of the image while other parts thereof may even be brought into sharper focus. Moreover, systems for defocusing an objective in this manner are rather complex and inconvenient to operate.

It is known, e.g., from U.S. Pat. No. 3,603,676, to create such a blurring effect by inserting a diaphanous light-dispersing plate between two lenses of an objective, the plate being introduced from the side so as to cause an unsymmetrical cutoff of a progressively increasing number of light rays passing between these lenses. A uniform dimming of the picture (or, conversely, a brightening thereof upon the withdrawal of the light-scattering plate) is possible with such an arrangement only if the plate motion occurs in close proximity to the plane of a focusing diaphragm acting as an aperture stop.

The general object of our present invention is to provide an optical system affording greater flexibility in the positioning of the movable defocusing element.

A more particular object is to provide a defocusing element which can be mounted in an objective housing without taking up significant additional space and without requiring the provision of a lateral slot for its operative insertion and withdrawal.

These objects are realized, pursuant to our present invention, by constructing the defocusing element as a blurring diaphragm centered on the objective axis, this blurring diaphragm including at least one pair of iris leaves of light-scattering translucent material which are symmetrically movable toward and away from that axis in the manner of the leaves of conventional iris diaphragms.

Such a conventional diaphragm, operable for focusing purposes independently of the blurring diaphragm, may in fact be aligned therewith in the space between a front and a rear lens or lens group, yet the two diaphragms may be separated by one or more lenses inasmuch as the fade-in or fade-out effect of the blurring diaphragm will be symmetrical even if that diaphragm is substantially offset from the plane of the exit pupil.

The leaves of a blurring diaphragm according to our invention advantageously consist of a synthetic resin, such as polypropylene, which at the thicknesses here considered (fractions of a millimeter) is sufficiently light-transmissive even in those regions where adjoining leaves overlap. It is advantageous, however, to choose the shape of the leaves in such a way as to minimize the extent of their overlap.

The invention will be described in greater detail hereinafter with reference to the accompanying drawing in which:

FIG. 1 is a diagrammatic view of an objective system embodying the invention;

FIG. 2 is a cross-sectional view of a blurring diaphragm forming part of the system of FIG. 1;

FIG. 3 is a face view of the blurring diaphragm shown in FIG. 2; and

FIG. 4 is a view similar to FIG. 1, illustrating a modification.

The optical system 1 shown in FIG. 1 comprises a varifocal front group A and a fixed rear group or basic objective B. Front group A consists, in a manner well known per se, of a stationary front lens 11 of positive refractivity, two axially movable intermediate lenses 12 and 13 of negative refractivity and a fixed positive rear lens 14. Objective B is composed of three air-spaced lenses, i.e., a first lens 15 of weak (preferably positive) refractivity, a biconcave second lens 16 and a biconvex third lens 17. A conventional focusing diaphragm 2, e.g., of the iris type, is inserted between lenses 14 and 15 to operate as an exit pupil for the front group A and an entrance pupil for the rear group B.

In accordance with this invention, a blurring diaphragm 3 is interposed between lenses 15 and 16. As more fully illustrated in FIGS. 2 and 3, diaphragm 3 comprises a fixed mounting ring 7, a coaxial control ring 8 and a circular array of pivotally mounted iris leaves 4 with pins 5 and 6 secured to these leaves, pins 5 being received in holes 5' of ring 7 whereas pins 6 are movable in slots 6' of ring 8. Rotation may be imparted to the control ring 8 by a conventional transmission linking it with a setting ring outside the objective housing. The iris leaves 4 of diaphragm 3, the contour of one of which has been indicated in dotted lines in FIG. 3, consist of translucent plastic material and limitedly overlap one another when ring 8 is rotated in a sense narrowing the central aperture defined thereby. The overall brightness of the image is, however, only slightly affected by the position of this diaphragm, which is desirable in that it avoids eye strain in the observer.

The low refractive power of lens 15 insures that the blurring diaphragm 3, although physically separated from focusing diaphragm 2 by a considerable distance, is still sufficiently remote from the focal plane of the objective B to avoid any undesirable vignetting effect.

The relative position of diaphragms 2 and 3 may also be inverted, as shown in FIG. 4. This latter arrangement is particularly advantageous where, as likewise illustrated in this Figure, the focusing diaphragm 2 is conventionally controlled by a photometer such as a solar cell 18 to which light rays are directed by a semireflector 19 forming part of a view-finding system with a mirror 20 and an eyepiece 21. The cell 18 adjusts the diaphragm 2 through the intermediary of a controller 22 which normally is set only in accordance with the brightness of the incident light from front group A (FIG. 1); when the blurring diaphragm 3 is actuated, the reduction in light intensity detected by sensor 18, 22 is translated into a wider opening of diaphragm 2 so that the brightness of the image remains substantially constant.

We claim:

1. In a camera objective having rear lens means and front lens means spaced apart along an optical axis, the combination therewith of a blurring diaphragm with a mounting ring centered on said axis and interposed between said front and rear leans means, said blurring diaphragm having a circular array of iris leaves of light-scattering translucent material pivotally mounted on said ring and symmetrically movable toward said axis for defocusing an image projected by said front and rear leans means; an iris diaphragm with opaque leaves aligned with said blurring diaphragm and disposed between said front and rear lens means beyond said blurring diaphragm as seen in the direction of incident light; sensing means responsive to the light intensity between said diaphragms; and control means for said iris diaphragm responsive to said sensing means for opening said iris diaphragm upon closure of said blurring diaphragm.

2. In a camera objective having rear lens means and front lens means spaced apart along an optical axis, the combination therewith of a blurring diaphragm centered on said axis and interposed between said front and rear lens means, said blurring diaphragm having at least one pair of iris leaves of light-scattering translucent material symmetrically movable toward said axis for defocusing an image projected by said front and rear lens means; an iris diaphragm with opaque leaves aligned with said blurring diaphragm and disposed between said front and rear lens means beyond said blurring diaphragm as seen in the direction of incident light; sensing means responsive to the light intensity between said diaphragms; and control means for said iris diaphragm responsive to said sensing means for opening said iris diaphragm upon closure of said blurring diaphragm.

3. The combination defined in claim 2 wherein said translucent material is synthetic-resin foil.

4. The combination defined in claim 2, further comprising an additional lens interposed between said diaphragms.

5. The combination defined in claim 4 wherein said additional lens has near-zero refractive power.

* * * * *